US011956495B2

(12) United States Patent
Park et al.

(10) Patent No.: US 11,956,495 B2
(45) Date of Patent: Apr. 9, 2024

(54) SOURCE DEVICE AND WIRELESS SYSTEM

(71) Applicant: LG ELECTRONICS INC., Seoul (KR)

(72) Inventors: Sukwon Park, Seoul (KR); Yongtaek Gong, Seoul (KR); Jaewon Oh, Seoul (KR); Kyungmee Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/767,006

(22) PCT Filed: Oct. 7, 2019

(86) PCT No.: PCT/KR2019/013102
§ 371 (c)(1),
(2) Date: Apr. 6, 2022

(87) PCT Pub. No.: WO2021/070976
PCT Pub. Date: Apr. 15, 2021

(65) Prior Publication Data
US 2022/0377406 A1 Nov. 24, 2022

(51) Int. Cl.
*H04N 21/472* (2011.01)
*H04N 21/41* (2011.01)
(Continued)

(52) U.S. Cl.
CPC ..... *H04N 21/4363* (2013.01); *H04N 21/4108* (2013.01); *H04N 21/4122* (2013.01);
(Continued)

(58) Field of Classification Search
CPC .......... H04N 21/4363; H04N 21/4126; H04N 21/437; H04N 21/4108; H04N 21/472;
(Continued)

(56) References Cited

U.S. PATENT DOCUMENTS

2014/0006483 A1* 1/2014 Garmark ................. H04L 67/01
709/203
2015/0095510 A1* 4/2015 Bhorkar .............. H04L 65/1083
709/231
(Continued)

FOREIGN PATENT DOCUMENTS

EP          3 190 786 A2   7/2017
KR   10-2015-0068683 A    6/2015
(Continued)

*Primary Examiner* — John R Schnurr
(74) *Attorney, Agent, or Firm* — Birch, Stewart, Kolasch & Birch, LLP

(57) ABSTRACT

According to an embodiment, a source device for providing a screen sharing service with a sync device may include a display, a communication circuit configured to perform communication with the sync device, and a processor configured to receive a connection request for the screen sharing service from the sink device through the communication circuit, execute a home application for providing a home screen of the sink device according to the received connection request, display an execution screen of the home application on the display according to execution of the home application, and transmit image data corresponding to the displayed execution screen of the home application to the sink device through the communication circuit.

10 Claims, 15 Drawing Sheets

(51) Int. Cl.
  *H04N 21/414* (2011.01)
  *H04N 21/43* (2011.01)
  *H04N 21/4363* (2011.01)
  *H04N 21/437* (2011.01)
  *H04N 21/462* (2011.01)
  *H04N 21/422* (2011.01)

(52) U.S. Cl.
  CPC ... *H04N 21/4126* (2013.01); *H04N 21/41407* (2013.01); *H04N 21/43076* (2020.08); *H04N 21/43637* (2013.01); *H04N 21/437* (2013.01); *H04N 21/4622* (2013.01); *H04N 21/472* (2013.01); *H04N 21/422* (2013.01)

(58) Field of Classification Search
  CPC ......... H04N 21/4122; H04N 21/41407; H04N 21/43076; H04N 21/43637; H04N 21/4622; H04N 21/422
  See application file for complete search history.

(56) References Cited

U.S. PATENT DOCUMENTS

| | | | | |
|---|---|---|---|---|
| 2017/0199715 A1* | 7/2017 | Manchinasetti | ........ | G06F 3/048 |
| 2021/0152879 A1* | 5/2021 | Choi | .................... | H04N 21/482 |

FOREIGN PATENT DOCUMENTS

| | | |
|---|---|---|
| KR | 10-2018-0138014 A | 12/2018 |
| KR | 10-2019-0069870 A | 6/2019 |
| KR | 10-2019-0073682 A | 6/2019 |
| KR | 10-2019-0106730 A | 9/2019 |

* cited by examiner

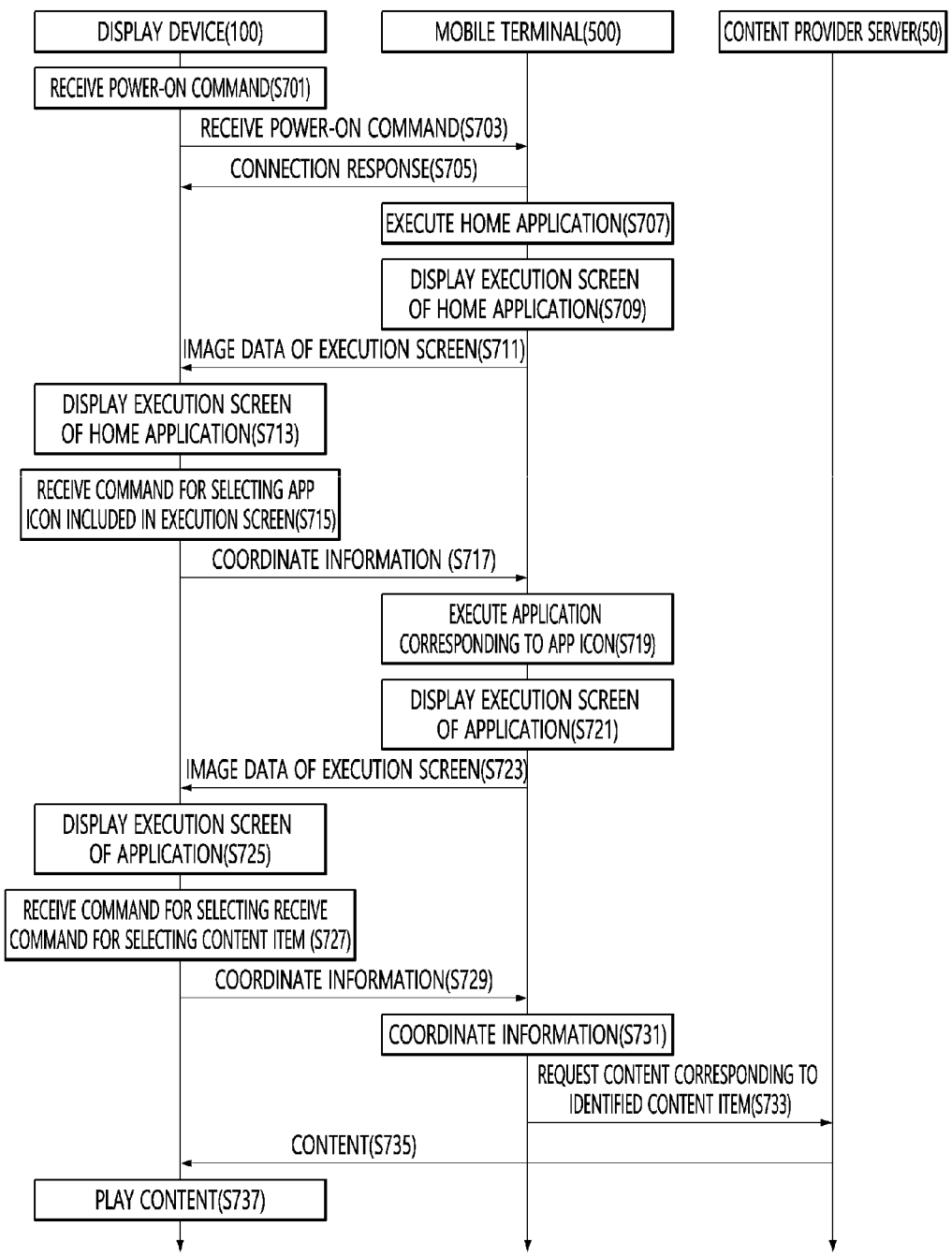

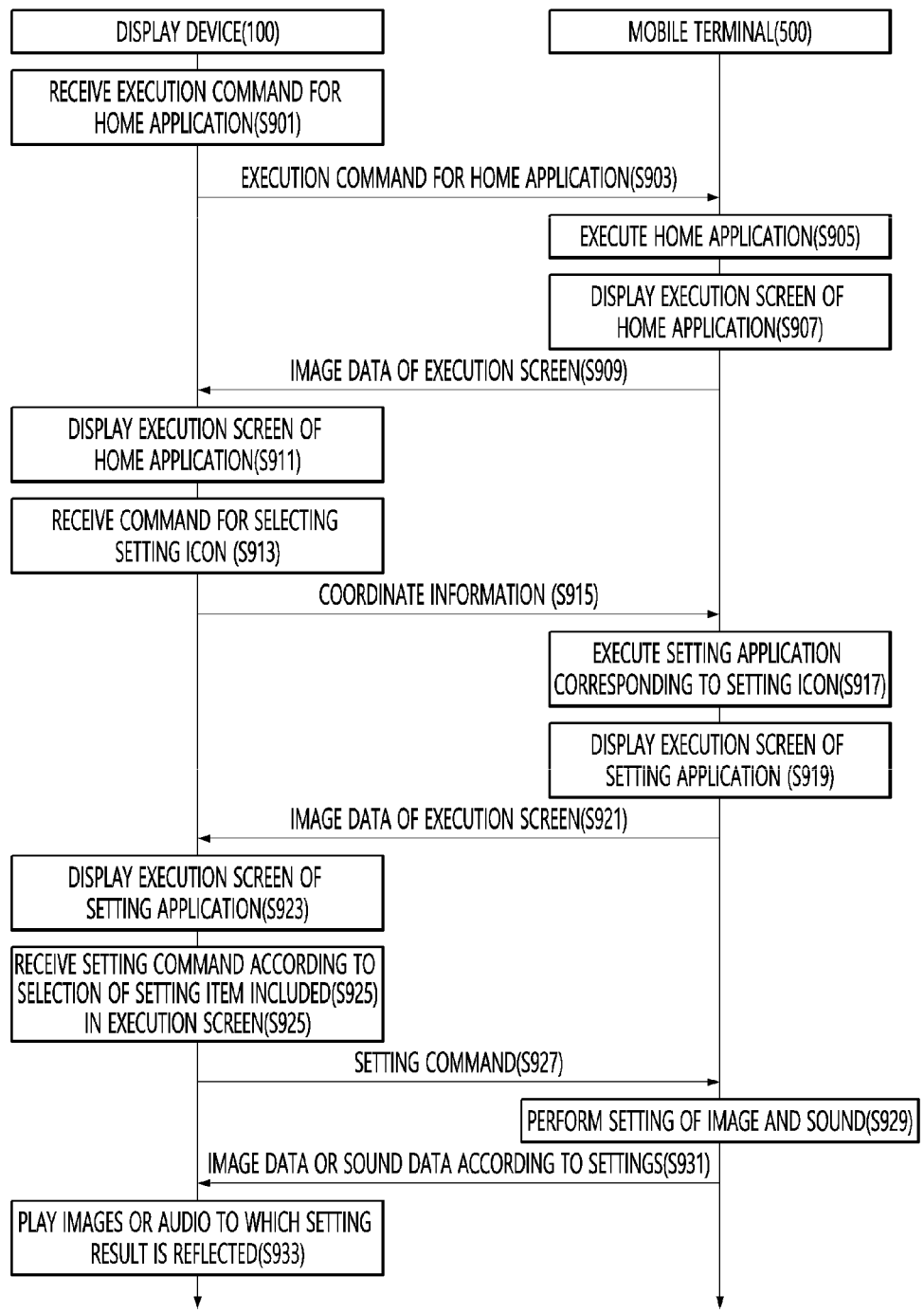

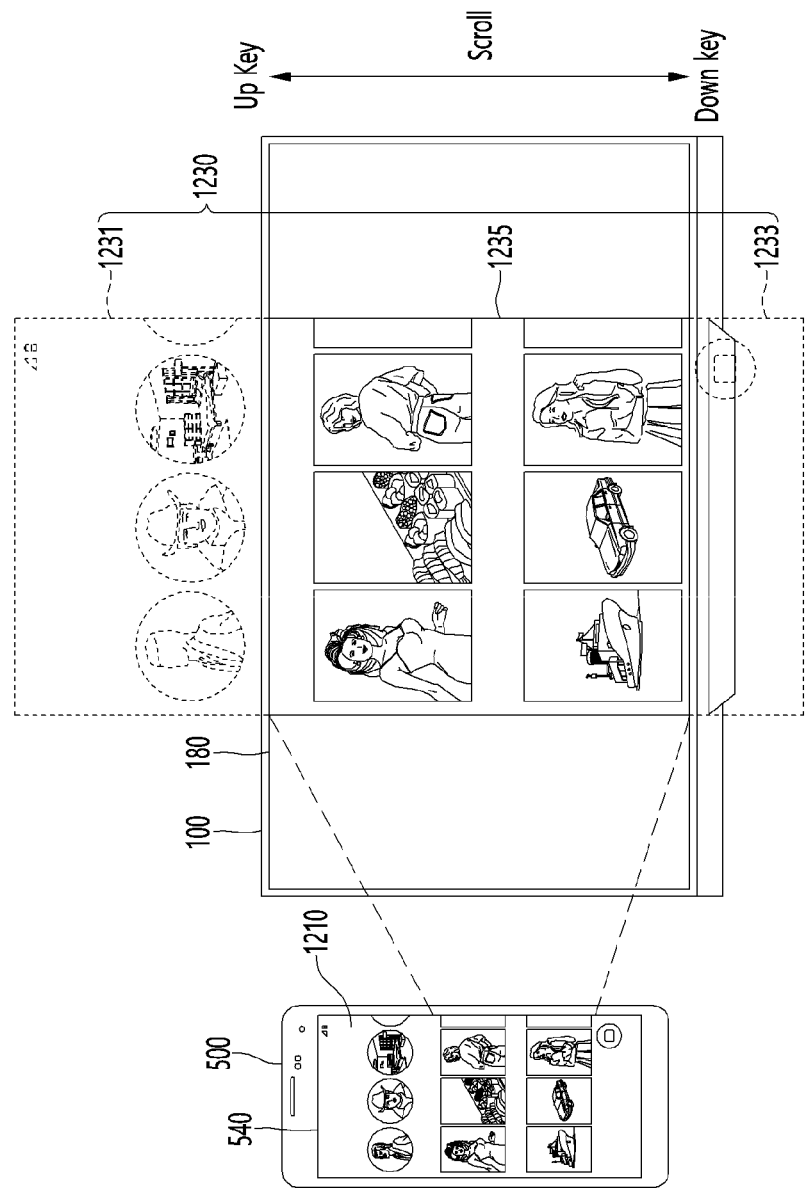

SOURCE DEVICE AND WIRELESS SYSTEM

CROSS-REFERENCE TO A RELATED APPLICATION

This application is the National Phase of PCT International Application No. PCT/KR2019/013102, filed on Oct. 7, 2019, which is hereby expressly incorporated by reference into the present application.

TECHNICAL FIELD

The present disclosure relates to an invention for providing a screen sharing service.

BACKGROUND ART

Digital TV services using wired or wireless communication networks are becoming common. The digital TV services may provide various services that cannot be provided by existing analog broadcasting services.

For example, in IPTV (Internet Protocol Television) and smart TV services, which are types of digital TV services, interactivity is provided so that users can actively select the types of programs to watch, the viewing time, and the like. IPTV and smart TV services may provide various additional services, such as Internet search, home shopping, online games, or the like based on interactivity.

Also, recently, a cloud service function in which a cloud server performs most TV functions on behalf of TV to minimize the services of applications running on TV has emerged.

However, for such a cloud service function, there is a disadvantage in that a large cost is paid for the construction, management, and maintenance of the infrastructure of the cloud server.

DISCLOSURE

Technical Problem

An object of the present disclosure is to provide a sink device with an effect of using a cloud server without a cost of using a cloud server by utilizing a high-performance source device.

An object of the present disclosure is to set an image mode or a sound mode of a sink device suitable for content through a source device.

An object of the present disclosure is to discover/automatically connect a sink device and a connection device, control an application of a source device with a remote control device on a large screen of the sink device, and cast a video

Technical Solution

According to an embodiment, a source device for providing a screen sharing service with a sync device may include a display, a communication circuit configured to perform communication with the sync device, and a processor configured to receive a connection request for the screen sharing service from the sink device through the communication circuit, execute a home application for providing a home screen of the sink device according to the received connection request, display an execution screen of the home application on the display according to execution of the home application, and transmit image data corresponding to the displayed execution screen of the home application to the sink device through the communication circuit.

According to an embodiment, a wireless system for providing a screen sharing service may include a source deice and a sink device, wherein the sink device may transmit a connection request for a screen sharing service to the source device based on a power-on command, the source device may execute a home application for providing a home screen of the sink device according to the received connection request, display an execution screen of the home application according to execution of the home application, and transmit image data corresponding to the displayed execution screen of the home application to the sink device, and the sink device may display the execution screen of the home application based on the received image data.

Advantageous Effects

According to various embodiments of the present disclosure, by utilizing a high-performance source device, a smart service can be provided in a cheap sink device product with low-spec H/W without paying a separate cloud server cost, and new functions and service upgrades are very easy.

In addition, an optimal viewing environment may be provided by setting the video/audio mode to be appropriate for the viewing content in the sink device setting app of the source device.

In addition, a convenient viewing environment may be provided by automatically discovering a source device connected to the sink device, easily controlling an application of the sink device through a large screen of the sink device with a remote control device, and casting a video.

DESCRIPTION OF DRAWINGS

FIG. 7 is a ladder diagram for a method of operating a system according to an embodiment of the present disclosure.

FIG. 9 is a ladder diagram for describing a method of operating a system according to another embodiment of the present disclosure.

FIGS. 12a and 12b are diagrams comparing the prior art with a process of performing screen control through a remote control device when a screen is shared between a source device and a sink device.

MODE FOR INVENTION

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

A display device according to an embodiment of the present disclosure, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
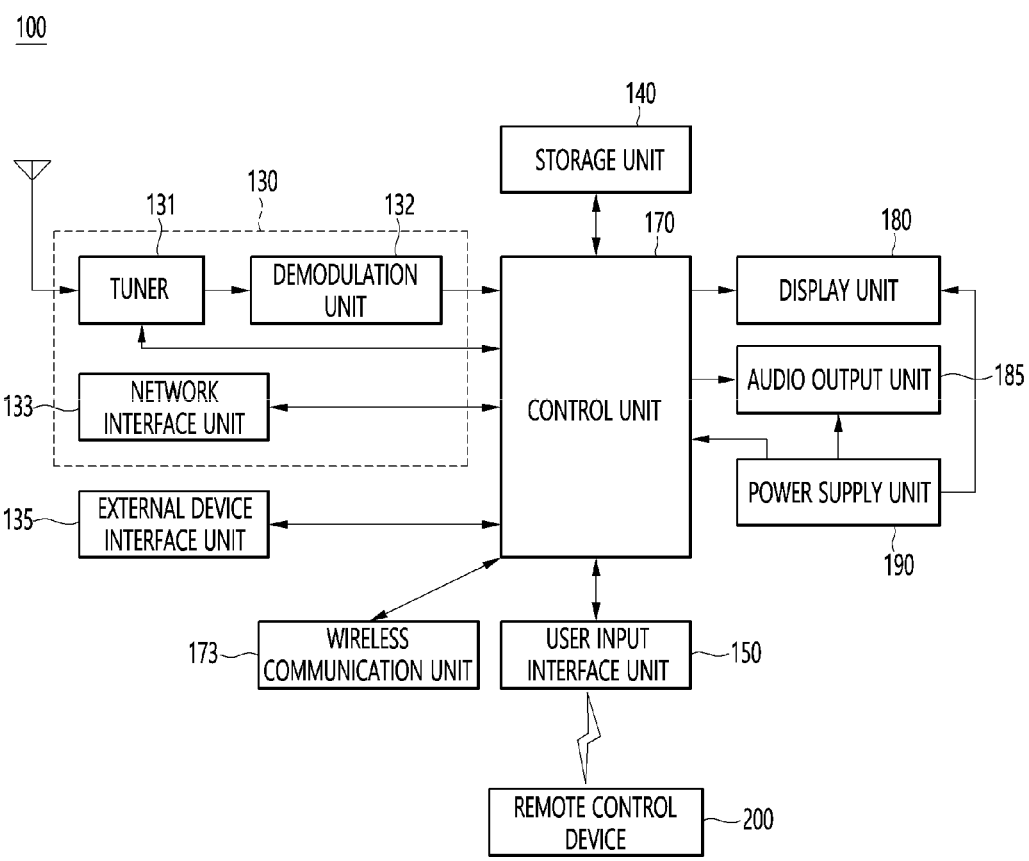
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception unit 130, an external device interface unit 135, a storage unit 140, a user interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one an image or audio output from an external device that is wirelessly or wiredly connected to the display device 100 and deliver it to the control unit 170. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A sound signal of an external device input through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system, but this is just exemplary.

The network interface unit 133 can provide an interface for connecting the display device 100 to a wired/wireless network including the Internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, the network interface unit 133 can transmit or receive data to or from a corresponding server by accessing a predetermined webpage through the network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an Internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily storing image, voice, or data signals output from the external device interface unit 135 or the network interface unit 133 and can store information on a predetermined image through a channel memory function.

The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user.

The user interface unit 150 can deliver signals input by a user to the control unit 170 or deliver signals from the control unit 170 to a user. For example, the user interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user interface unit 150 can deliver, to the control unit 170, control signals input from local keys (not shown) such as a power key, a channel key, a volume key, and a setting key.

Image signals that are image-processed in the control unit 170 can be input to the display unit 180 and displayed as an image corresponding to corresponding image signals. Additionally, image signals that are image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135.

Besides that, the control unit 170 can control overall operations in the display device 100.

Additionally, the control unit 170 can control the display device 100 by a user command or internal program input through the user interface unit 150 and download a desired application or application list into the display device 100 in access to network.

The control unit 170 can output channel information selected by a user together with processed image or voice signals through the display unit 180 or the audio output unit 185.

Additionally, according to an external device video playback command received through the user interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present disclosure described below can be performed by one of the display device described with reference to FIG. 1, an image processing device such as the separated set-top box, and a content playback device including the display unit 180 and the audio output unit 185.

Figure 2:
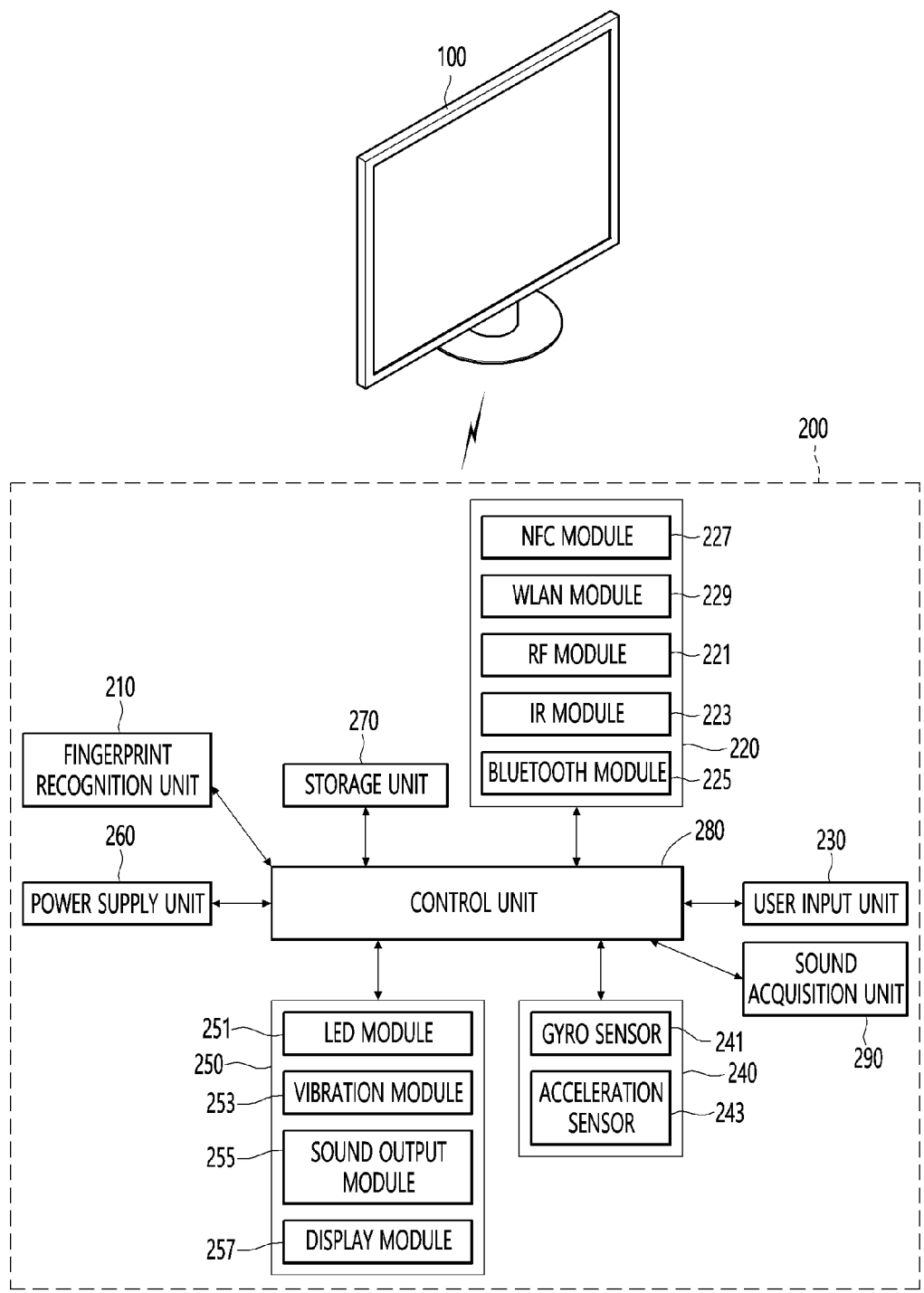
FIG. 2 is a block diagram illustrating a remote control device according to an embodiment of the present disclosure.
Figure 3:
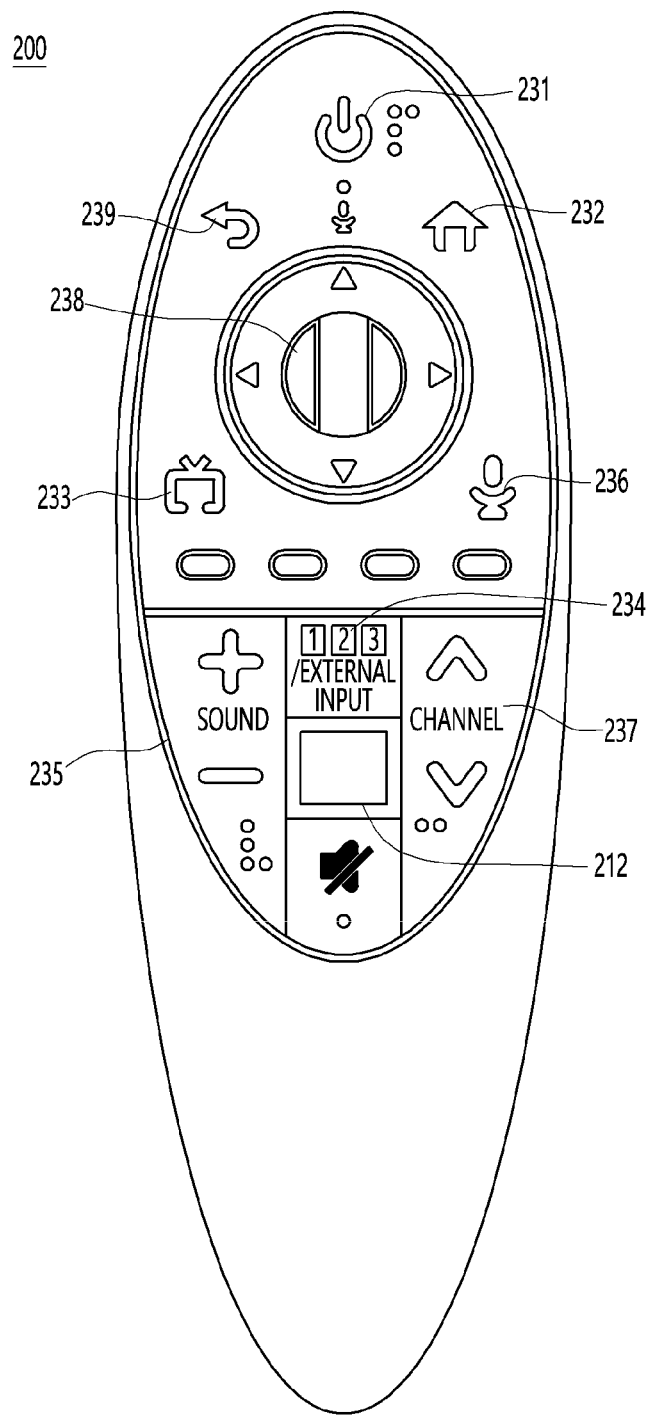
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present disclosure.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a OK button 238, and a back button 239.

The fingerprint recognition button 212 may be a button for recognizing a user's fingerprint. In one embodiment, the fingerprint recognition button 212 may enable a push operation, and thus may receive a push operation and a fingerprint recognition operation. The power button 231 may be a button for turning on/off the power of the display device 100. The home button 232 may be a button for moving to the home screen of the display device 100. The live button 233 may be a button for displaying a real-time broadcast program. The external input button 234 may be a button for receiving an external input connected to the display device 100. The volume control button 235 may be a button for adjusting the level of the volume output by the display device 100. The voice recognition button 236 may be a button for receiving a user's voice and recognizing the received voice. The channel change button 237 may be a button for receiving a broadcast signal of a specific broadcast channel. The OK button 238 may be a button for selecting a specific function, and the back-play button 239 may be a button for returning to a previous screen.

A description will be given referring again to FIG. 2.

When the user input unit 230 includes a touch screen, the user may input a command related to the display device 100 to the remote control device 200 by touching a soft key of the touch screen. In addition, the user input unit 230 may include various types of input means that may be operated by a user, such as a scroll key or a jog key, and the present embodiment does not limit the scope of the present disclosure.

The sensor unit 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display unit 180.

The output unit 250 may output a video or audio signal corresponding to the operation of the user input unit 235 or a signal transmitted from the display device 100. The user may recognize whether the user input unit 235 is operated or whether the display device 100 is controlled through the output unit 250.

For example, the output unit 250 may include an LED module 251 that emits light, a vibration module 253 that generates vibration, a sound output module 255 that outputs sound, or a display module 257 that outputs an image when the user input unit 235 is operated or a signal is transmitted and received through the wireless communication unit 225.

In addition, the power supply circuit 260 may supply power to the remote control device 200, and stop power supply when the remote control device 200 has not moved for a predetermined time to reduce power consumption. The power supply unit 260 may restart power supply when a predetermined key provided in the remote control device 200 is operated.

The storage unit 270 may store various types of programs and application data required for control or operation of the remote control device 200. When the remote control device 200 transmits and receives signals wirelessly through the display device 100 and the RF module 221, the remote control device 200 and the display device 100 transmit and receive signals through a predetermined frequency band.

The control unit 280 of the remote control device 200 may store and refer to information on a frequency band capable of wirelessly transmitting and receiving signals to and from the display device 100 paired with the remote control device 200 in the storage unit 270.

The control unit 280 may control all matters related to the control of the remote control device 200. The control unit 280 may transmit a signal corresponding to a predetermined key operation of the user input unit 235 or a signal corresponding to the movement of the remote control device 200 sensed by the sensor unit 240 through the wireless communication unit 225.

Additionally, the sound acquisition unit 290 of the remote control device 200 can obtain voice.

The sound acquisition unit 290 can include at least one microphone and obtain voice through the microphone 291.

Next, a description will be given referring to FIG. 4.

Figure 4:
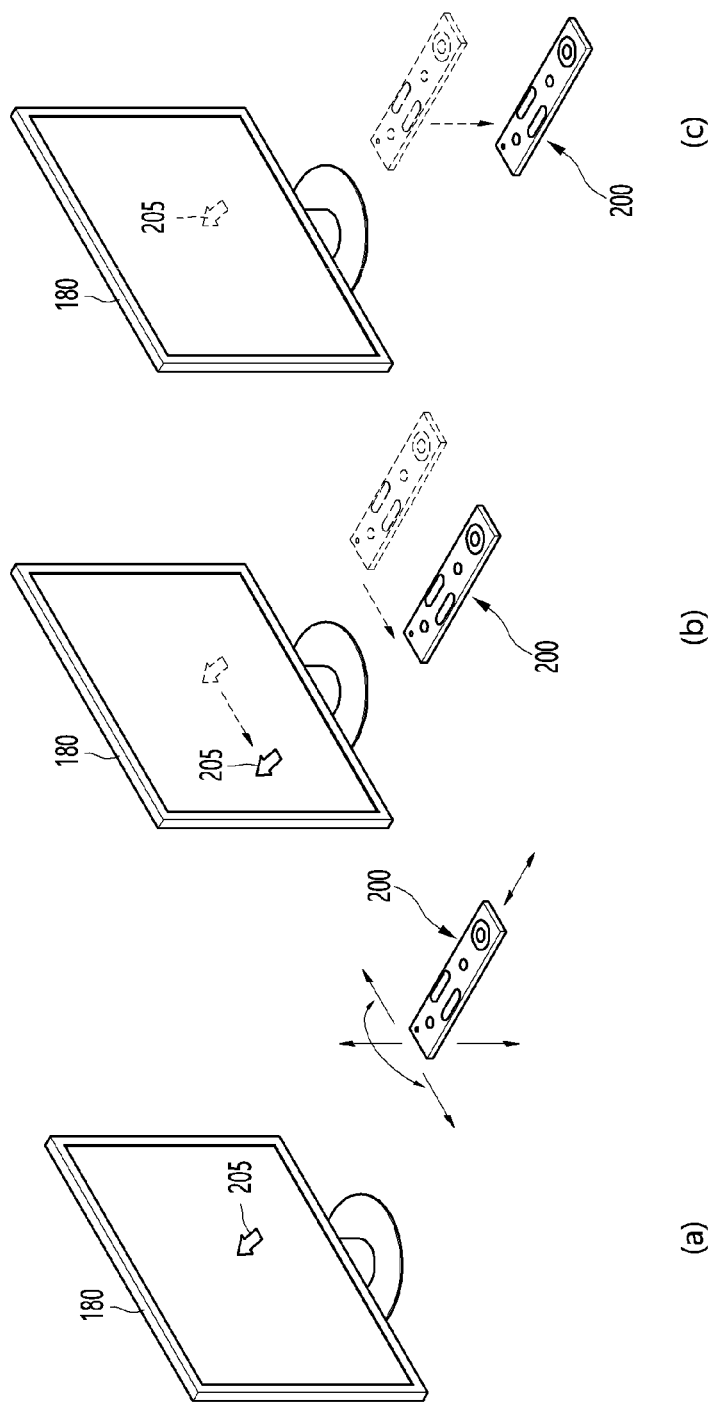
FIG. 4 shows an example using a remote control device according to an embodiment of the present disclosure.

FIG. 4 shows an example using a remote control device according to an embodiment of the present disclosure.

FIG. 4(a) illustrates that a pointer 205 corresponding to the remote control device 200 is displayed on the display unit 180.

The user may move the remote control device 200 up, down, left and right, or rotate the remote control device 200. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(b) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(c) illustrates that while a specific button in the remote control device 200 is pressed, a user moves the remote control device 200 away from the display unit 180. Thus, a selection area in the display unit 180 corresponding to the pointer 205 can be zoomed in and displayed larger.

On the other hand, if a user moves the remote control device 200 close to the display unit 180, a selection area in the display unit 180 corresponding to the pointer 205 can be zoomed out and displayed in a reduced size.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. That is, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
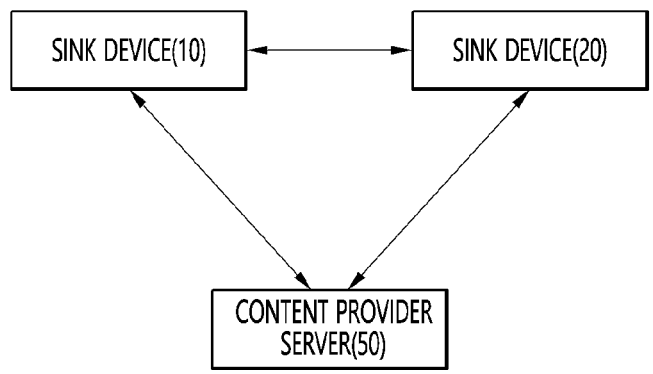
FIG. 5 is a diagram for describing a configuration of a wireless system according to an embodiment of the present disclosure.

FIG. 5 is a diagram for describing a configuration of a wireless system according to an embodiment of the present disclosure.

Referring to FIG. 5, a wireless system 5 may include a display device 100, a mobile terminal 500, and a content provider server 50.

The mobile terminal 500 and the display device 100 may provide a screen sharing service.

The mobile terminal 500 may transmit image data of an image which is being displayed on the mobile terminal 500 to the display device 100, and the display device 100 may display the image which is being displayed by the mobile terminal 500 based on the received image data.

The mobile terminal 500 may be called a source device in that the mobile terminal 500 provides an image, and the display device 100 may be called a sink device in that the display device 100 receives an image.

The content provider server 50 may cast a video to the display device 100 based on a request received from the mobile terminal 500.

The content provider server 50 may stream a video to the mobile terminal 500 or the display device 100.

Figure 6:
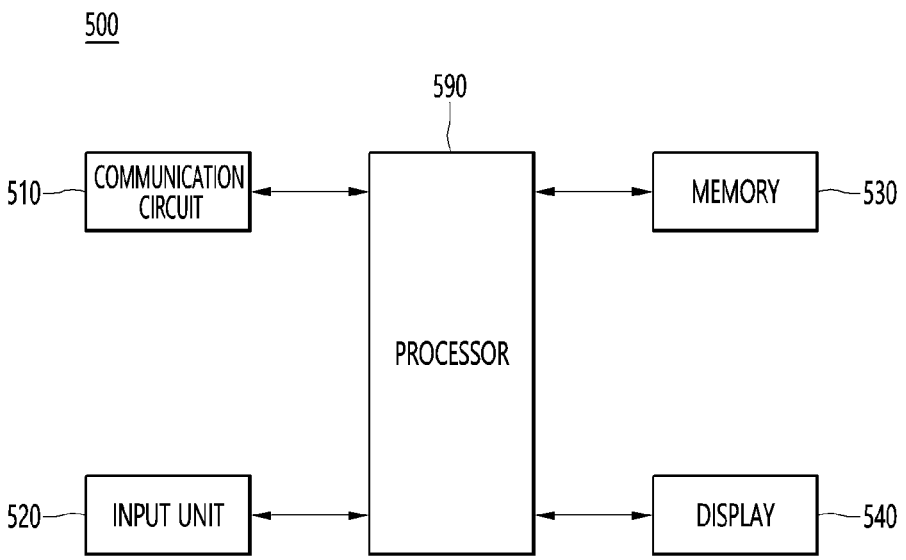
FIG. 6 is a block diagram for describing a configuration of a mobile terminal according to an embodiment of the present disclosure.

FIG. 6 is a block diagram for describing a configuration of a mobile terminal according to an embodiment of the present disclosure.

The mobile terminal 100 may be implemented by a stationary device or a mobile device, such as a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a desktop computer, and the like.

Referring to FIG. 6, the mobile terminal 100 may include a communication circuit 510, an input unit 520, a memory 530, a display 540, and a processor 590.

The communication circuit 510 may transmit/receive data to and from external devices such as other mobile terminals or servers using wired/wireless communication technologies.

The communication circuit 510 may perform communication using any one communication standard among GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

In this case, the input unit 520 may include a camera for inputting a video signal, a microphone for receiving an audio signal, and a user input unit for receiving information from a user.

The camera or the microphone may be treated as a sensor, and the signal acquired from the camera or the microphone may be referred to as sensing data or sensor information.

The memory 530 may store various software and data related to the operation of the mobile terminal 100.

The display 540 may display an image signal received from the outside.

The processor 590 may control the overall operation of the mobile terminal 100.

When the connection of an external device is required to perform the operation of the mobile terminal 100, the processor 590 may generate a control signal for controlling the external device and may transmit the generated control signal to the external device.

The processor 590 may acquire intention information for the user input and may determine the user's requirements based on the acquired intention information.

The processor 590 may control at least part of the components of the mobile terminal 100 so as to drive an application program stored in memory 170.

The processor 590 may operate two or more of the components included in the mobile terminal 100 in combination so as to drive the application program.

Next, a method of operating a system according to an embodiment of the present disclosure will be described with reference to FIG. 7.

FIG. 7 is a ladder diagram for describing a method of operating a system according to an embodiment of the present disclosure.

The control unit 170 of the display device 100 may receive a power-on command (S701).

The control unit 170 may receive a power-on command from the remote control device 200.

As another example, the control unit 170 may receive a power-on command through a power button provided in the display device 100.

The power-on command may be a command for turning on the power of the display device 100 or the display unit 180.

The control unit 170 of the display device 100 may transmits a connection request to the mobile terminal 500 through the wireless communication unit 173 according to reception of the power-on command (S703).

When receiving the power-on command, the control unit 170 may transmit a connection request to the mobile terminal 500 for automatic connection with the mobile terminal 500.

The connection request may include a command for turning on a mirroring function indicating a screen sharing function.

The control unit 170 may transmit a connection request to the mobile terminal 500 through a wireless communication standard. The wireless communication standard may be SSDP (Simple Service Discovery Protocol, SSDP), but this is only an example.

In response to the connection request, the processor 590 of the mobile terminal 500 may transmit a connection response to the display device 100 through the communication circuit 510 (S705).

The connection response may be a response indicating that automatic connection with the display device 100 is permitted.

Thereafter, the processor 590 of the mobile terminal 500 may execute a home application (S707).

After a wireless connection with the display device 100 is established, the processor 590 of the mobile terminal 500 may automatically execute a home application installed in the mobile terminal 500.

The home application may be an application capable of providing a home screen of the display device 100.

The home application may also be installed on the display device 100.

The processor 590 of the mobile terminal 500 may display an execution screen according to the execution of the home application on the display 540 (S709).

The processor 590 may display the execution screen of the home application including one or more app icons on the display 540 according to the execution of the home application.

The processor 590 of the mobile terminal 500 may transmit image data of the execution screen to the display device 100 (S711).

The processor 590 may transmit image data of the execution screen of the application to the display device 100 through the communication circuit 510 for screen sharing.

The control unit 170 of the display device 100 may display the execution screen of the home application on the display unit 180 based on the image data of the execution screen of the home application (S713).

The control unit 170 of the display device 100 may display an execution screen being displayed on the display 540 of the mobile terminal 500 based on the received image data.

The control unit 170 of the display device 100 may convert the resolution of the execution screen being displayed by the mobile terminal 500 to correspond to the resolution of the display unit 180, and display the execution screen of the home application on the display unit 180.

The control unit 170 of the display device 100 may receive a command for selecting an app icon included in the execution screen through a pointer 205 controlled by the remote control device 200 (S715).

The pointer 205 may be an object that can be moved by movement of the remote control device 200.

The control unit 170 may receive a command for selecting an app icon included in the execution screen of the home application from the remote control device 200.

The control unit 170 of the display device 100 may transmit coordinate information of the pointer 205 for selecting the app icon to the mobile terminal 500 (S717).

The control unit 170 may obtain coordinate information of the pointer 205 which has selected the app icon, and transmit the obtained coordinate information to the mobile terminal 500.

The processor 590 of the mobile terminal 500 may execute an application corresponding to the app icon based on the coordinate information (S719), and display an execution screen of the application on the display 540 (S721).

The processor 590 of the mobile terminal 500 may obtain a location on the display 540 corresponding to the coordinate information received from the display device 100 and select an app icon located at the obtained location.

The processor 590 of the mobile terminal 500 may execute an application corresponding to the selected app icon according to the selection of the app icon.

The processor 590 of the mobile terminal 500 may transmit image data of the execution screen of the application to the display device 100 (S723), and the control unit 170 of the display device 100 may display the execution screen of the application on the display unit 180 based on the received image data (S725).

Since a screen is shared between the display device 100 and the mobile terminal 500, when the screen displayed by the display 540 of the mobile terminal 500 is changed, the screen displayed by the display unit 180 of the display device 100 may also be changed.

That is, the control unit 170 of the display device 100 may switch the execution screen of the home application to the execution screen of the application.

The control unit 170 of the display device 100 may receive a command for selecting one content item from among a plurality of content items included in the execution screen of the application through the pointer 205 controlled by the remote control device 200 (S727).

The execution screen of the application may include a plurality of content items corresponding to each of a plurality of pieces of content.

The content may be any one of video, URL, and audio.

The control unit 170 may receive a command for selecting any one of the plurality of content items from the remote control device 200.

The control unit 170 of the display device 100 may transmit coordinate information of the pointer 205 which has selected a content item to the mobile terminal 500 (S729).

The control unit 170 may transmit coordinate information indicating a location of the pointer 205 located on the content item to the mobile terminal 500.

The control unit 170 may transmit the coordinate information and a command for selecting an app icon located in the coordinate information to the mobile terminal 500 together.

The processor 590 of the mobile terminal 500 may identify the content item based on the received coordinate information (S731).

The processor 590 may obtain a location on the display 540 corresponding to the received coordinate information, and identify a content item located in the obtained location.

The processor 590 may select the identified content item.

The processor 590 of the mobile terminal 500 may request content corresponding to the identified content item from the content provider server 50 (S733).

The processor 590 may transmit a request message requesting transmission of the content corresponding to the content item to the display device 100 to the content provider server 50 through the communication circuit.

As another example, the processor 590 may transmit a request message requesting transmission of the content corresponding to the content item to the mobile terminal 500 to the content provider server 50 through the communication circuit.

The content provider server 50 may transmit the content to the display device 100 in response to a request received from the mobile terminal 500 (S735).

The control unit 170 of the display device 100 may play the content received from the content provider server 50 (S737).

Hereinafter, the embodiment of FIG. 7 will be described as a specific example.

Figure 8A:
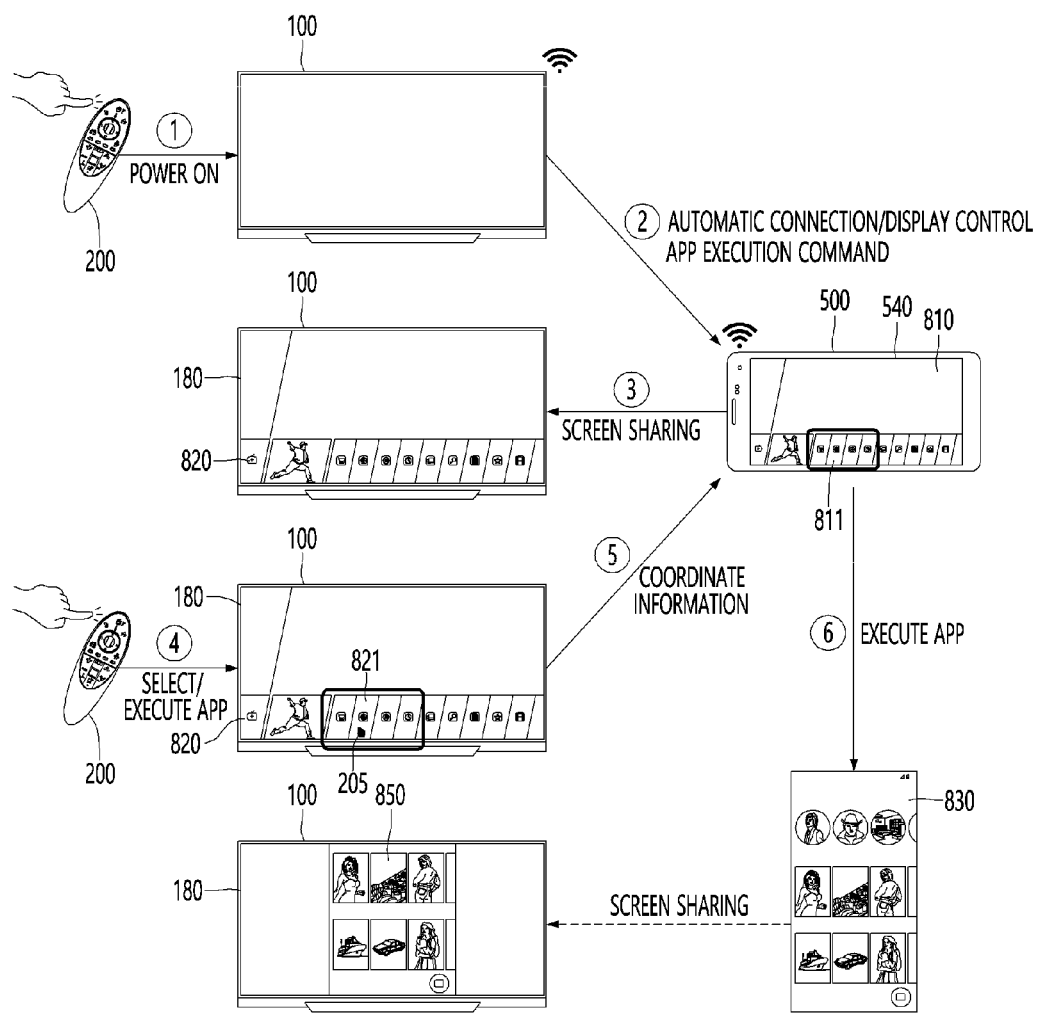
FIGS. 8a and 8b are diagrams for describing an example of executing an application installed on a display device on a mobile terminal and providing a video streaming service to the display device through a mobile terminal, according to an embodiment of the present disclosure.
Figure 8B:
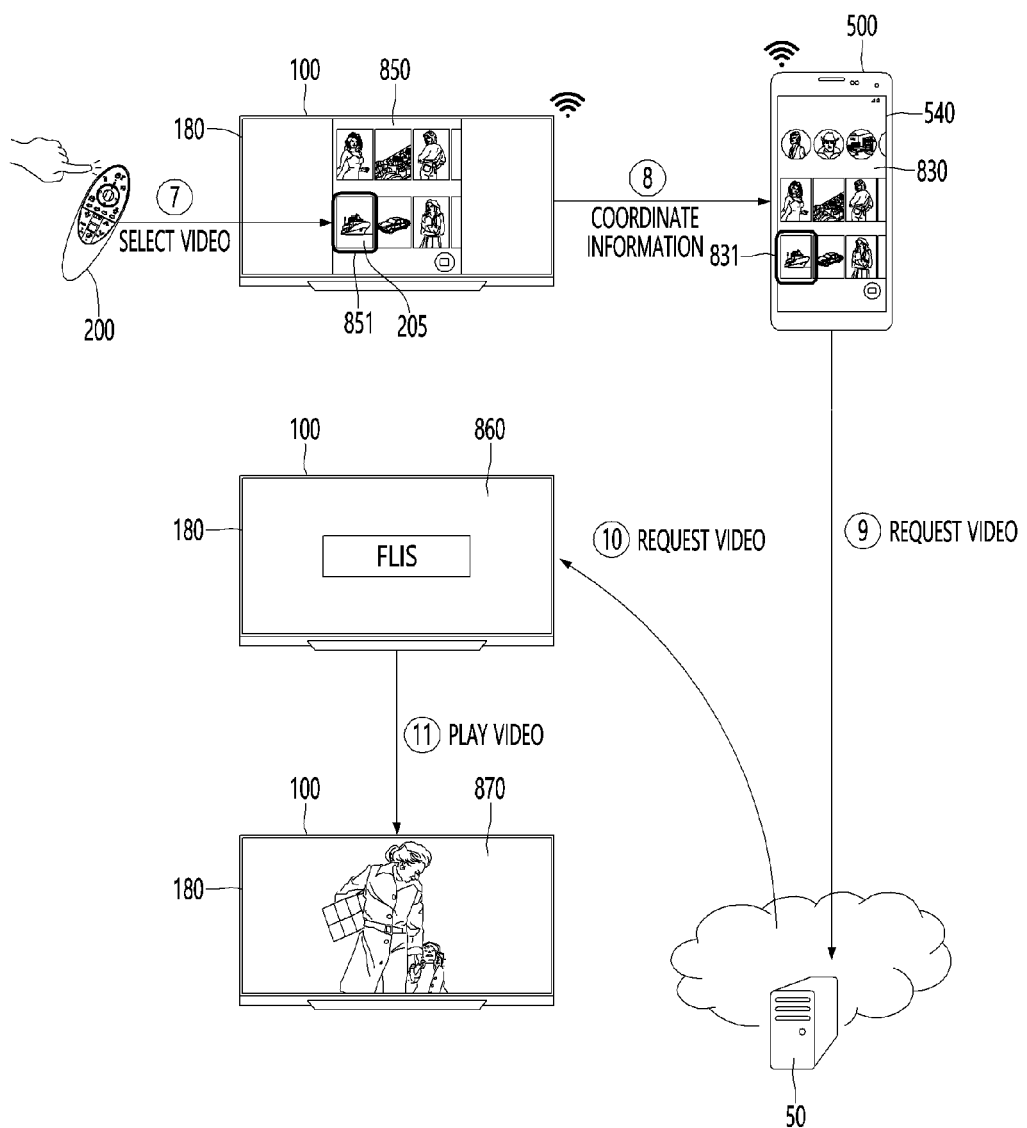

FIGS. 8a and 8b are diagrams for describing an example of executing an application installed on a display device on a mobile terminal and providing a video streaming service to the display device through a mobile terminal, according to an embodiment of the present disclosure.

Referring to FIG. 8a, a user may select the power button 231 provided in the remote control device 200. Accordingly, the display device 100 may receive a power-on command from the remote control device 200.

After turning on the power of the display unit 180, the display device 100 may search for the mobile terminal 500 located nearby.

The display device 100 may be automatically connected to the mobile terminal 500.

After the power is turned on, the display device 100 may transmit a command for executing a home application to the mobile terminal 500.

The home application may be an application for providing a home screen of the display device 100.

The mobile terminal 500 may display an execution screen 810 of the home application on the display 540. The execution screen 810 of the home application may be a home screen of the display device 100.

The mobile terminal 500 may share the execution screen 810 of the home application with the display device 100. That is, the mobile terminal 500 may transmit image data for the execution screen 810 of the home application to the display device 100, through a mirroring function.

The display device 100 may display the execution screen 820 of the home application through the display unit 180 based on the received image data.

The execution screen 820 of the home application may include a plurality of app icons corresponding to each of the plurality of applications.

The display device 100 may receive a command for selecting any one of a plurality of app icons from the remote control device 200. The user may select the app icon 821 through the pointer 205 by operating the remote control device 200.

The app icon 821 may be an icon corresponding to an application capable of providing a video streaming service.

When the app icon 821 is selected, the display device 100 may extract coordinate information where the pointer 205 is located, and transmit the extracted coordinate information to the mobile terminal 500.

The mobile terminal 500 may select an app icon 811 corresponding to the coordinate information received from the display device 100.

The mobile terminal 500 may execute a relevant application according to the selection of the app icon 811 and display the execution screen 830 of the executed application.

At the same time, the mobile terminal 500 may share the execution screen 830 of the application with the display device 100 using a mirroring function.

The display device 100 may display an execution screen 850 of an application which provides a video streaming service on the display unit 180 according to screen sharing.

Referring to FIG. 8B, the display device 100 may receive a command for selecting one of a plurality of video items included in the execution screen 850 of the application from the remote control device 200.

The user may select the video item 851 through the pointer 205 by operating the remote control device 200.

The display device 100 may extract coordinate information indicating a location of the pointer 205 when the video item 851 is selected, and transmit the extracted coordinate information and a command for selecting the video item 851 to the mobile terminal 500.

The mobile terminal 500 may obtain a location matching the coordinate information on the execution screen 830 of the application based on the coordinate information received from the display device 100.

The mobile terminal 500 may select a video item 831 in the obtained location.

The mobile terminal 500 may request a video corresponding to the video item 831 from the content provider server 50 according to the selection of the video item 831.

The mobile terminal 500 may request the content provider server 50 to stream content to the display device 100.

The content provider server 50 may cast a video to the display device 100 in response to a request received from the mobile terminal 500.

That is, the content provider server 50 may provide a video streaming service to the display device 100. In this case, the request transmitted from the mobile terminal 500 to the content provider server 50 may include a network address (e.g., MAC address) of the display device 100.

The display device 100 may play a video received from the content provider server 50 through the display unit 180.

The display device 100 may sequentially play an initial video 860 indicating the source of the content provider server 50 and a content video 870.

When the display device 100 receives a cast request for streaming playback of a video from the content provider server 50, in order to prevent a screen transient state, the display device 100 may play the initial video 860 indicating the source of the content provider server 50 and then play the content video 870.

As another example, when a cast request for streaming playback of a video is detected, the display device 100 may turn off the screen of the display unit 180 and disconnect the connection for mirroring with the mobile terminal 500.

Thereafter, the display device 100 may play the content video 870 streamed from the content provider server 50.

As described above, according to an embodiment of the present disclosure, it is possible to provide a smart service function to a sink device such as a low-spec display device 100 using a high-performance source device, such as the mobile terminal 500, without paying a usage cost for a separate cloud server.

Accordingly, it is possible to significantly facilitate new smart service functions and service upgrades and reduce costs associated with the use of the cloud server by the sink device.

Next, a process of setting video or sound of a sink device through a source device will be described.

FIG. 9 is a ladder diagram for describing a method of operating a system according to another embodiment of the present disclosure.

Subsequent steps may be steps performed after step S737 of FIG. 7.

The control unit 170 of the display device 100 may receive an execution command for executing a home application (S901).

The control unit 170 may receive the execution command for executing the home application from the remote control device 200.

The control unit 170 may receive the execution command from the remote control device 200 while the content 870 shown in FIG. 8B is being played.

The control unit 170 may receive the execution command according to a selection of the home button 232 provided in the remote control device 200 by a user input.

The control unit 170 of the display device 100 may transmit the received execution command to the mobile terminal 500 (S903).

The processor 590 of the mobile terminal 500 may execute the home application according to the execution command received from the display device 100 (S905) and display an execution screen of the home application (S907).

The processor 590 may switch from a previously-displayed screen to the execution screen of the home application according to the execution command received from the display device 100.

The processor 590 of the mobile terminal 500 may transmit image data of the execution screen to the display device 100 (S909).

The control unit 170 of the display device 100 may display the execution screen of the home application on the display unit 180 based on the image data of the execution screen of the home application (S911).

The control unit 170 of the display device 100 may receive a command for selecting a setting icon included in the execution screen of the home application through the pointer 205 controlled by the remote control device 200 (S913).

The control unit 170 of the display device 100 may transmit coordinate information of the pointer 205 which has selected the setting icon to the mobile terminal 500 (S915).

The control unit 17 may obtain coordinate information of the pointer 205 which has selected the setting icon and transmit the obtained coordinate information to the mobile terminal 500.

The processor 590 of the mobile terminal 500 may execute a setting application corresponding to the setting icon based on the coordinate information (S917), and display an execution screen of the setting application on the display 540 (S919).

The setting application may be an application for setting an operation or function of the display device 100.

The processor 590 of the mobile terminal 500 may transmit image data of the execution screen of the setting application to the display device 100 (S921), and the control unit 170 of the display device 100 may display the execution screen of the setting application on the display unit 180 based on the received image data (S923).

The execution screen of the setting application may include a plurality of setting items. Each of the plurality of setting items may be an item capable of setting an image mode or a sound mode.

The control unit 170 of the display device 100 may receive a setting command for selecting one of the plurality of setting items included in the execution screen of the home application through the pointer 205 controlled by the remote control device 200 (S925).

The control unit 170 of the display device 100 may transmit the setting command to the mobile terminal 500 (S927), and the processor 590 of the mobile terminal 500 may perform setting of images or sound according to the received setting command (S929).

The setting command transmitted to the mobile terminal 500 by the control unit 170 may include coordinate information of the pointer 205 which has selected the setting item and a selection command indicating that a location corresponding to the coordinate information has been selected.

The processor 590 may select an image mode or a sound mode corresponding to the setting item according to the coordinate information and the selection command received from the display device 100.

The processor 590 of the mobile terminal 500 may transmit one or more of image data or sound data according to the image setting or the sound setting to the display device 100 (S931).

The processor 590 may convert images or sound of the content according to the changed settings, and transmit the converted image data or sound data to the display device 100.

The control unit 170 of the display device 100 may play the images or audio to which the setting result is reflected (S933).

Figure 10:
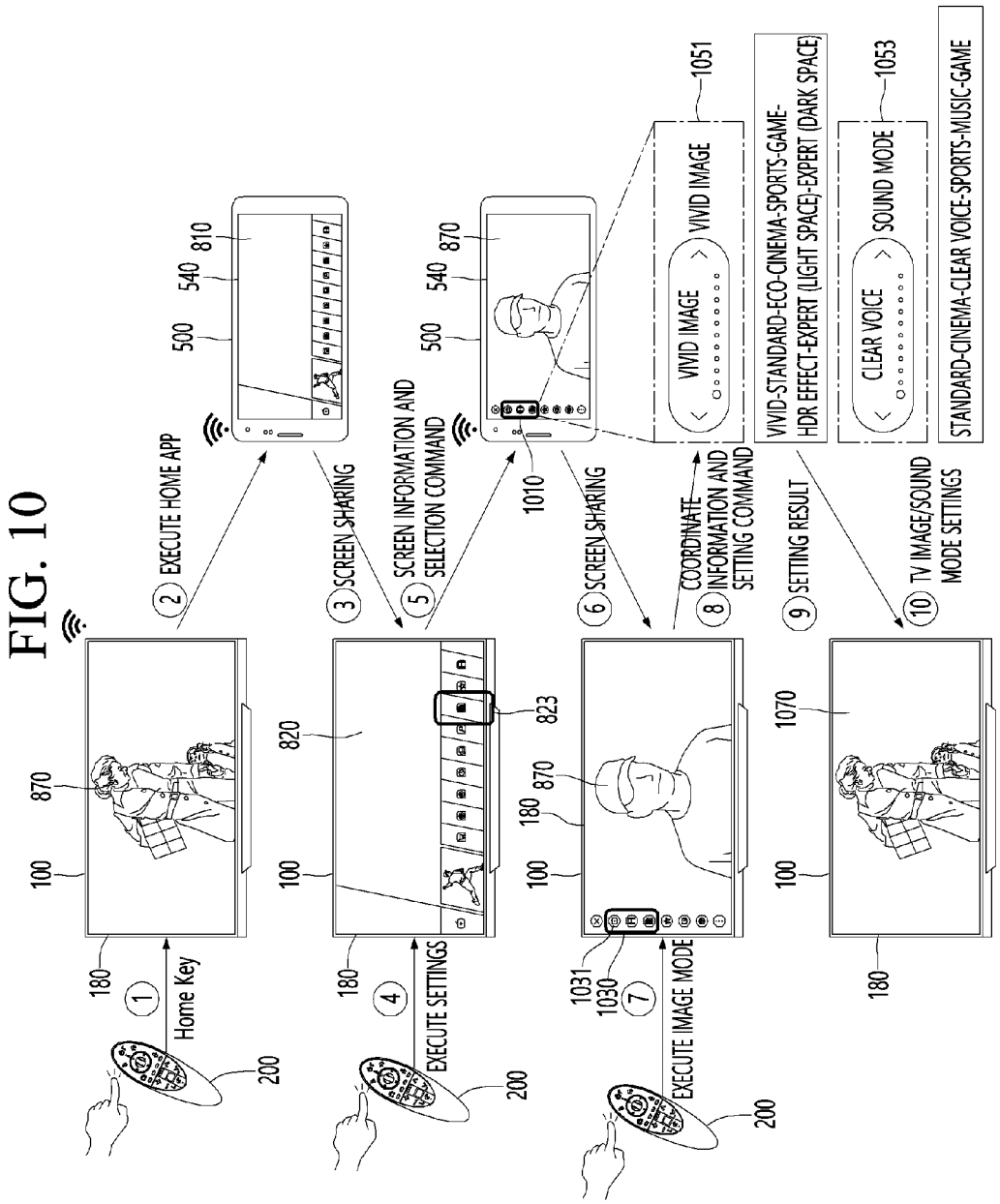
FIG. 10 is a diagram for describing a process of setting an image or sound mode through a setting application installed in a mobile terminal and transmitting image data or sound data according to the settings to a display device according to an embodiment of the present disclosure.

FIG. 10 is a view for describing a process of setting an image or sound mode through a setting application installed in a mobile terminal and transmitting image data or sound data according to the settings to a display device according to an embodiment of the present disclosure.

In FIG. 10, it is assumed that the display device 100 and the mobile terminal 500 are sharing a screen through a short-range wireless communication standard.

It is assumed that FIG. 10 is a situation after the embodiment of FIG. 8B.

Referring to FIG. 10, the display device 100 is reproducing content 870 on the display unit 180.

The display device 100 may receive an execution command for executing a home application from the remote control device 200. The display device 100 may transmit an execution command for executing the home application received from the remote control device 200 to the mobile terminal 500.

When the home button 232 is selected, the remote control device 200 may transmit the execution command for the home application to the display device 100.

The mobile terminal 500 may display an execution screen 810 of the home application on the display 540 according to the execution command received from the display device 100.

Thereafter, the display device 100 may display the execution screen 820 of the home application on the display unit 180 according to a screen sharing function.

The display device 100 may receive a command for selecting a setting icon 823 included in the execution screen 820 of the home application from the remote control device 200.

The setting icon 823 may be an icon for executing a setting application used to set a function or operation of the display device 100.

The setting icon 823 may be selected through a pointer.

The display device 100 may transmit coordinate information of the pointer and a selection command for selecting an icon corresponding to the coordinate information to the mobile terminal 500.

The mobile terminal 500 may execute the setting application based on the coordinate information and selection command received from the display device 100, and display the execution screen 1010 of the setting application on the display 540.

The execution screen 1010 of the setting application may include an image setting item 1051 for setting an image mode and a sound setting item 1053 for setting a sound mode.

At the same time, the mobile terminal 500 may share the execution screen 1010 of the setting application with the display device 100. Accordingly, the display device 100 may also display the execution screen 1030 of the setting application.

The display device 100 may receive a command for selecting an image setting item 1031 included in the execution screen 1030 of the setting application from the remote control device 200.

The display device 100 may transmit coordinate information of a pointer that has selected the image setting item 1031 and a selection command to the mobile terminal 500.

The mobile terminal 500 may set an image mode according to the image setting item 1031 in response to the coordinate information and the selection command. For example, when the image setting item 1031 is a mode for sharpening an image, the mobile terminal 500 may adjust the brightness of the image.

The mobile terminal 500 may transmit image data whose brightness is adjusted to the display device 100.

The display device 100 may display the content 1070 of image data whose brightness is adjusted.

As described above, according to an embodiment of the present disclosure, an image mode or a sound mode of a sink device suitable for content may be set through a source device, and the corresponding data may be transmitted to the sink device. Accordingly, the user may view content having the optimal picture quality or sound quality through the sink device.

Figure 11:
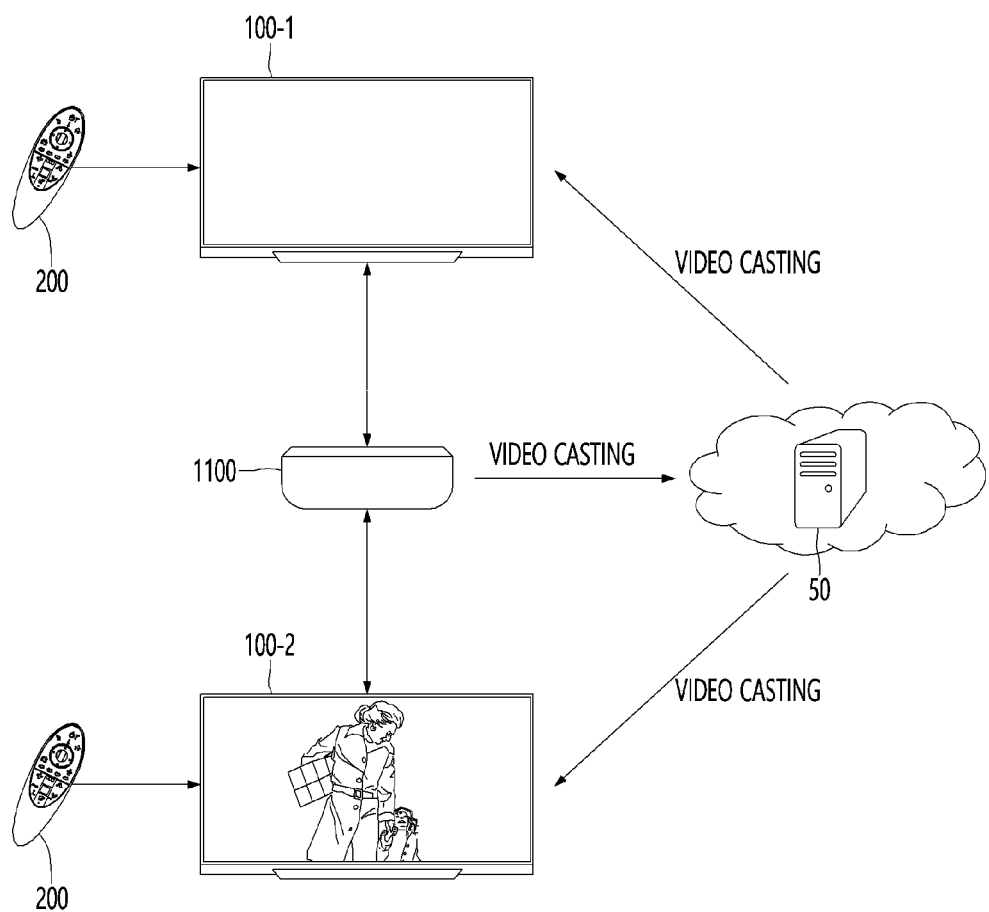
FIG. 11 is a diagram for describing a process of providing a smart service by allowing a set-top box and a plurality of display devices to interwork according to an embodiment of the present disclosure.

FIG. 11 is a view for describing a process of providing a smart service by allowing a set-top box and a plurality of display devices to interwork according to an embodiment of the present disclosure.

Referring to FIG. 11, it is assumed that a first display device 100-1 and a second display device 100-2 are sink devices, and a set-top box 1100 is a source device.

The first display device 100-1 and the set-top box 1100 may be connected through a short-range wireless communication standard.

The set-top box 1100 may include all of the components shown in FIG. 6.

Also, it is assumed that the first display device 100-1 is disposed in a living room and the second display device 100-2 is disposed in a room.

The first display device 100-1 may automatically connect to the set-top box 1100 when receiving a power-on command from the remote control device 200. The set-top box 1100 may execute a home application after being automatically connected to the first display device 100-1.

The set-top box 1100 may transmit image data for the execution screen of the home application to the first display device 100-1. The first display device 100-1 may display an execution screen of a home application based on the received image data.

The first display device 100-1 may receive a command for selecting a content application included in the execution screen of the home application from the remote control device 200.

The first display device 100-1 may transmit a selection command for selecting the content application and coordinate information of a pointer at the time when the content application is selected, to the set-top box 1100.

The set-top box 1100 may execute the content application based on the selection command and coordinate information received from the first display device 100-1, and transmit image data of an execution screen according to the execution to the first display device 100-1.

The first display device 100-1 may display the execution screen of the content application based on the image data of the execution screen. The first display device 100-1 may receive a command for selecting a video included in the execution screen.

The first display device 100-1 may transmit the selection command for the video and the coordinate information of a pointer at the time when the video is selected, to the set-top box 1100.

The set-top box 1100 may transmit a request for a corresponding video and a casting target of the video to the content provider server 50 based on the selection command and the coordinate information received from the first display device 100-1.

The content provider server 50 may stream the video to the first display device 100-1 based on the request and the casting target, which are received from the set-top box 1100.

The second display device 100-2 may also receive video casting in the same manner as above.

Conventionally, when the set-top box 1100 receives a high-resolution image from the content provider server 50 and wirelessly transmits the high-resolution image to the display device 100, there is degradation in image quality due to bandwidth limitations.

However, as described above, according to an embodiment of the present disclosure, the content provider server 50 may directly transmit the video to the display device 100 according to the streaming-based video casting method, thereby preventing the quality degradation in image quality.

Figure 12A:
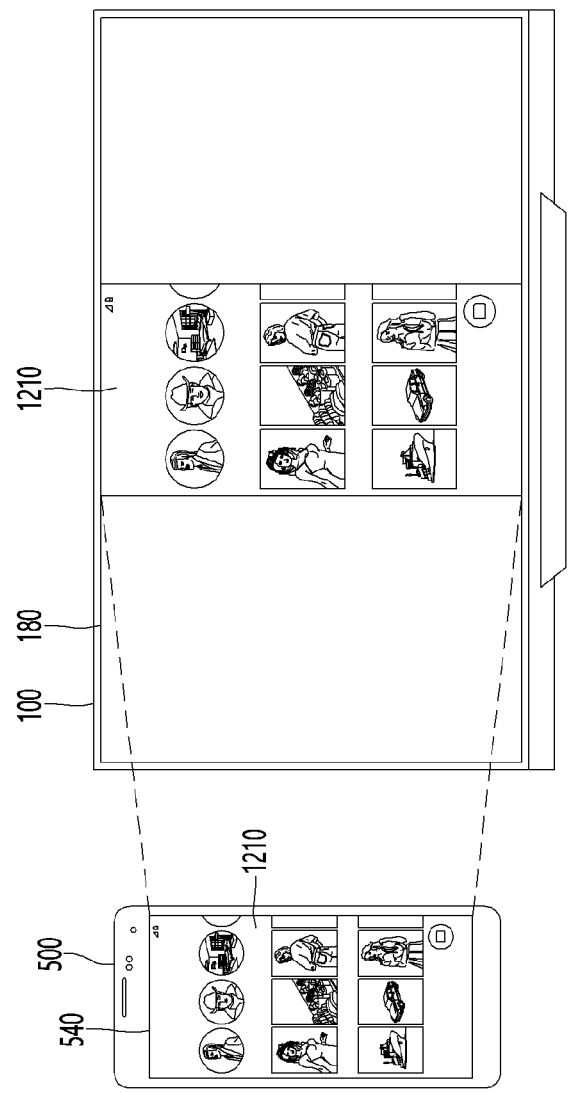

FIGS. 12*a* and 12*b* are diagrams comparing the prior art with a process of performing screen control through a remote control device when a screen is shared between a source device and a sink device.

Referring to FIGS. 12a and 12b, it is assumed that the mobile terminal 500 is arranged in a portrait mode (or vertical mode).

Referring to FIG. 12a, in the related art, when the mobile terminal 500 is in the portrait mode, an image 1210 displayed on the display 540 of the mobile terminal 500 is displayed on on the display unit 180 of the display device 100 as it is.

In general, the screen of the display unit 180 of the display device 100 is larger than the screen of the display 540 of the mobile terminal 500. Accordingly, in order to use the large screen of the display device 100, according to the present disclosure, a part of an image displayed on the display device 100 may be enlarged according to a zoom command.

Referring to FIG. 12B, the display device 100 may receive a zoom command from the remote control device 200, and transmit the zoom command and coordinates of a pointer at the time when the zoom command is received to the mobile terminal 500.

The mobile terminal 500 may enlarge the image 1210 based on the location of the corresponding coordinates based on the zoom command and the coordinates.

The mobile terminal 500 may transmit the enlarged image 1230 to the display device 100.

The display device 100 may display a partial image 1233 in which a part of the enlarged image 1230 is enlarged through the display unit 180.

The display device 100 may scroll the enlarged image 1230 in response to selection of an up key or a down key provided in the remote control device 200.

As described above, according to an embodiment of the present disclosure, it is possible to appropriately enlarge an image displayed on the source device arranged in the vertical direction to fit the image into the large screen of the sink device, and then share the image. Accordingly, the convenience of a user viewing the display device 100 with the large screen may be improved.

Figure 13:
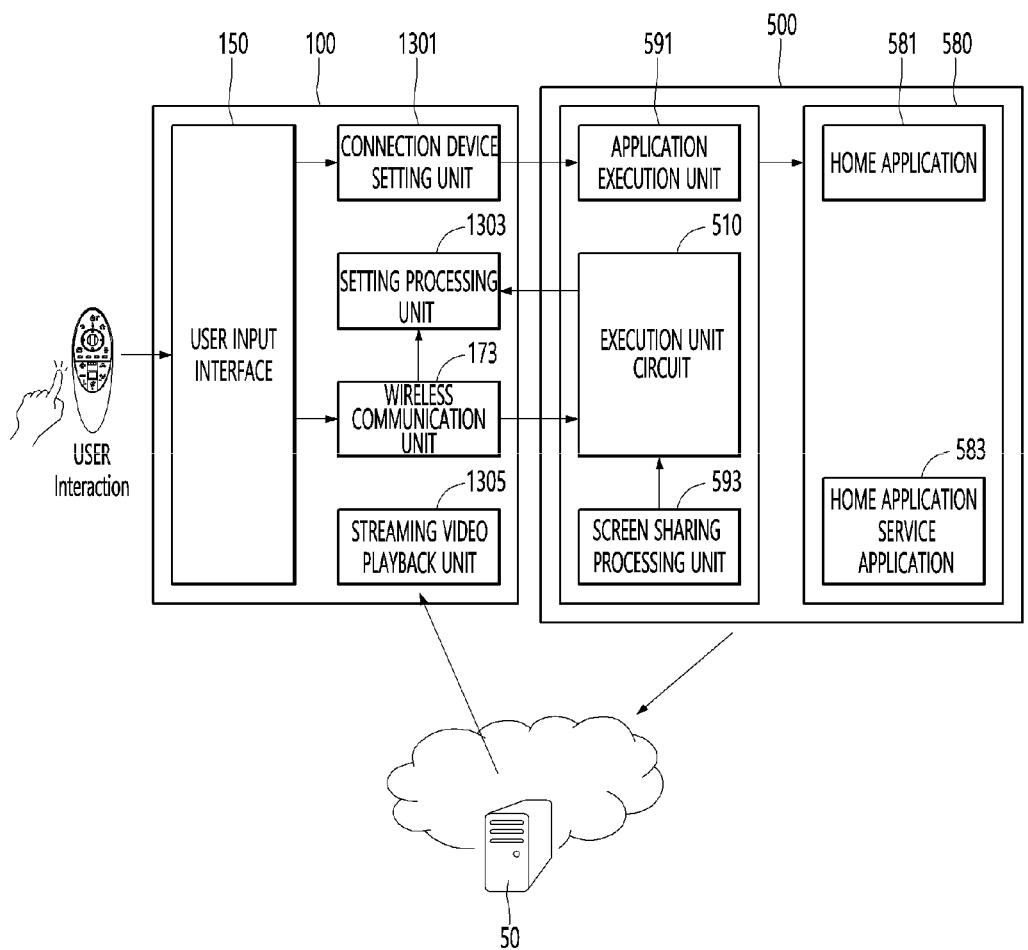
FIG. 13 is a diagram for describing a structural diagram for interaction between a display device and a mobile terminal according to an embodiment of the present disclosure.

FIG. 13 is a view for describing a structural diagram for interaction between a display device and a mobile terminal according to an embodiment of the present disclosure.

Referring to FIG. 13, the display device 100 may include a user input interface 150, a connection device setting unit 1301, a setting processing unit 1303, a wireless communication unit 173, and a streaming video playback unit 1305.

The user input interface 150 may receive a user input from the remote control device 200. The user input interface 150 may receive a command for turning on the power of the display device 100, a command for selecting an application icon displayed on the display unit 180, and the like.

In response to the power-on command received by the user input interface 150, the connection device setting unit 1301 may transmit an execution command for executing a home application installed in the mobile terminal 500 to the application execution unit 591 of the mobile terminal 500.

The connection device setting unit 1301 may be a component included in the control unit 170 or the wireless communication unit 173.

The setting processing unit 1303 may output image data or sound data to which the setting result is reflected to the display unit 180, the image data or sound data being received from the communication circuit 510 of the mobile terminal 500.

The setting processing unit 1303 may be included in the control unit 170.

The wireless communication unit 173 may perform short-range wireless communication with the communication circuit 510 of the mobile terminal 500. The wireless communication unit 173 may transmit/receive data for a function for sharing screen with the mobile terminal 500 to and from the communication circuit 510.

The streaming video player 1305 may stream the video received from the content provider server 50.

The streaming video playback unit 1305 may be included in the control unit 170 or the network interface unit 133.

The application execution unit 591 of the mobile terminal 500 may control execution of an application installed in the mobile terminal 500.

A home application 581 and a video streaming service application 583 may be installed in the mobile terminal 500.

The screen sharing processing unit 593 may process image data or sound data for a mirroring function with the display device 100.

The screen sharing processing unit 593 may convert image data to match the resolution of the display device 100, and transmit the converted image data to the communication circuit 510.

The screen sharing processing unit 593 may be included in the processor 590 of the mobile terminal 500.

The mobile terminal 500 may transmit a request to stream a video to the display device 100 to the content provider server 50. The content provider server 50 may cast a video to the display device 100 according to the request received from the mobile terminal 500.

Figure 14:
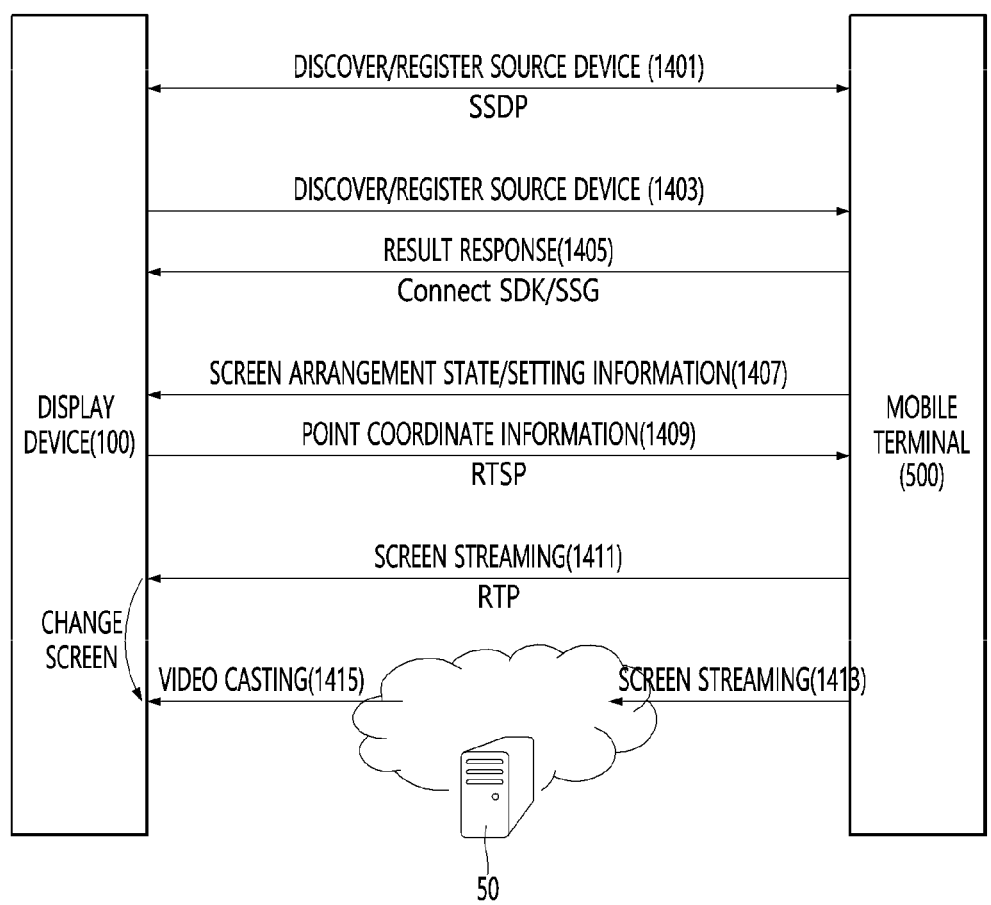
FIG. 14 is a diagram for describing a communication standard used during communication between a display device and a mobile terminal according to an embodiment of the present disclosure.

FIG. 14 is a view for describing a communication standard used during communication between a display device and a mobile terminal according to an embodiment of the present disclosure.

A wireless communication standard used in a device discovery and registration process 1401 for network connection between the display device 100 and the mobile terminal 500 may be Simple Service Discovery Protocol (SSDP).

After the display device 100 and the mobile terminal 500 are connected to the same network, a service used in the process 1403 in which the display device 100 transmits a mirroring-on command to the mobile terminal 500 and the process 1405 for transmitting a result response responding to the mirroring-on command to the display device 100 may be a second screen service.

The wireless communication standard used in a process 1409 in which the display device 100 transmits coordinate information 1409 of a pointer to the mobile terminal 500, or a process in which the mobile terminal 500 transmits screen arrangement state information or setting information to the display device 100 may be a RTSP (Real Time Streaming Protocol).

The wireless communication standard used in the screen streaming process 1411 for transmitting an image being displayed by the mobile terminal 500 to the display device 100 may be a Real Time Protocol (RTP).

The mobile terminal 500 may transmit data including a wfd-lg-capacity parameter to the display device 100. The wfd-lg-capacity parameter may be a parameter for setting an image or sound of the display device 100.

The mobile terminal 500 may transmit a video request 1413 to stream a video to the display device 100 to the content provider server 50. The content provider server 50 may cast the video to the display device 100 in response to the video request 1413 received from the mobile terminal 500.

Meanwhile, when a casting request is detected, the display device 100 may terminate a RTSP session after muting to prevent screen transient, thereby terminating mirroring.

The casting request may be a request to receive a video from the content provider server 50 in a streaming manner.

The muting may be a process of temporarily turning off the screen of the display unit 180.

When the casting request is detected, the display device 100 may turn off the screen, end the RTSP session, and play a video streamed from the content provider server 50 on a screen.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like, and may be implemented in the form of a carrier wave (for example, transmission through the Internet).

The display device described above is not limited to the configuration and method of the above-described embodiments, but the embodiments may be configured by selectively combining all or part of each embodiment such that various modifications can be made.

The invention claimed is:

1. A source device for providing a screen sharing service with a sink device, comprising:
   a display;
   a communication circuit configured to perform communication with the sink device; and
   a processor configured to:
      receive a connection request for the screen sharing service from the sink device through the communication circuit;
      execute a home application for providing a home screen of the sink device according to the received connection request;
      display an execution screen of the home application on the display according to execution of the home application;
      transmit image data corresponding to the displayed execution screen of the home application to the sink device through the communication circuit; and
      receive first coordinate information and a first selection command from the sink device, and select an app icon matching the first coordinate information on an execution screen of the home application based on the received first selection command,
   wherein the sink device disconnects connection for the screen sharing service with the source device, turns off a screen to hide a transient state, turns on the screen after the transient state is completed and plays the video streamed from a content provider server when a casting request is received from the content provider.

2. The source device of claim 1, wherein the processor is configured to display an execution screen of an application corresponding to the selected app icon on the display, and transmit image data corresponding to the execution screen of the application to the sink device.

3. The source device of claim 2, wherein the application is a video streaming application for providing a video streaming service,
   wherein the processor is configured to receive second coordinate information and a second selection command from the sink device, and select a content item matching the second coordinate information on an execution screen of the video streaming application based on the received second selection command.

4. The source device of claim 3, wherein the processor is configured to transmit a request to stream a video corresponding to the selected content item to the sink device to the content provider server.

5. The source device of claim 2, wherein the application is a setting application for settings of the sink device, and
   wherein the processor is configured to receive third coordinate information and a third selection command from the sink device, and select a setting item matching the third coordinate information on an execution screen of the setting application based on the received third selection command.

6. The source device of claim 5, wherein the processor is configured to transmit video data or sound data set by selection of the setting item to the sink device.

7. A wireless system for providing a screen sharing service, comprising:
   a source device and a sink device;
   wherein the sink device transmits a connection request for a screen sharing service to the source device based on a power-on command,
   wherein the source device executes a home application for providing a home screen of the sink device according to the received connection request, displays an execution screen of the home application according to execution of the home application, and transmits image data corresponding to the displayed execution screen of the home application to the sink device,
   wherein the sink device displays the execution screen of the home application based on the received image data, and
   wherein the source device receives first coordinate information and a first selection command from the sink device, and selects an app icon matching the first coordinate information on an execution screen of the home application based on the received first selection command,
   wherein the sink device disconnects connection for the screen sharing service with the source device, turns off a screen to hide a transient state, turns on the screen after the transient state is completed and plays a video streamed from the content provider server when a casting request is received from the content provider.

8. The wireless system of claim 7, wherein the source device displays an execution screen of an application corresponding to the selected app icon, and transmits image data corresponding to the execution screen of the application to the sink device.

9. The wireless system of claim 8, wherein the application is a video streaming application for providing a video streaming service,
   wherein the source device receives second coordinate information and a second selection command from the sink device, and selects a content item matching the second coordinate information on an execution screen of the video streaming application based on the received second selection command.

10. The wireless system of claim 9, wherein the source device transmits a request to stream a video corresponding to the selected content item to the sink device to the content provider server.

* * * * *